Sept. 10, 1940.  T. A. DELANEY  2,214,662
ACTUATING MECHANISM FOR MOWING MACHINE KNIVES
Filed Sept. 2, 1938  2 Sheets-Sheet 1
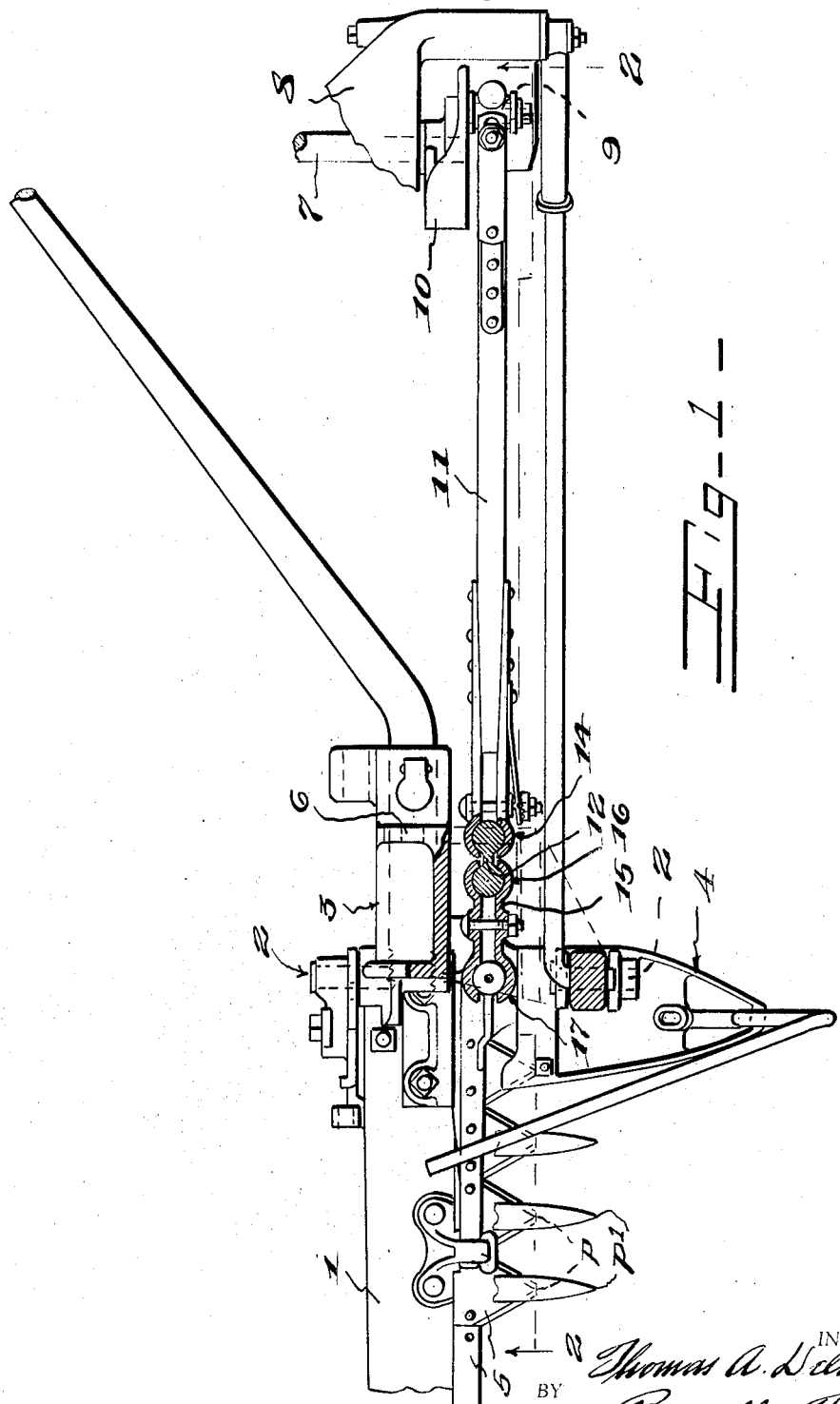
INVENTOR.
Thomas A. Delaney
BY
Bodell & Thompson
ATTORNEYS.

Sept. 10, 1940.    T. A. DELANEY    2,214,662
ACTUATING MECHANISM FOR MOWING MACHINE KNIVES
Filed Sept. 2, 1938    2 Sheets-Sheet 2
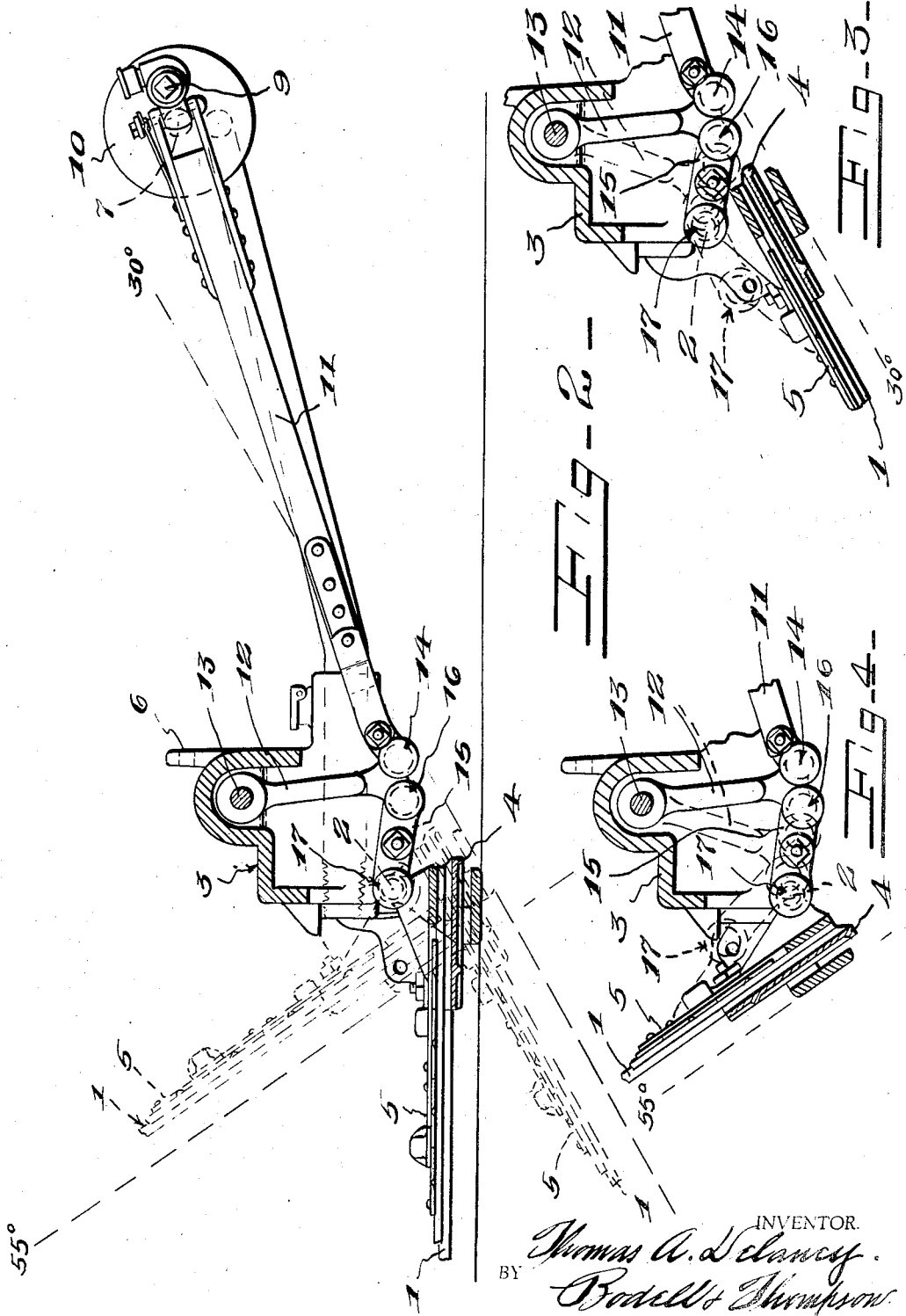

Patented Sept. 10, 1940

2,214,662

UNITED STATES PATENT OFFICE 2,214,662

ACTUATING MECHANISM FOR MOWING MACHINE KNIVES

Thomas A. Delaney, Syracuse, N. Y., assignor to Charles S. Brown, Syracuse, N. Y.

Application September 2, 1938, Serial No. 228,193

1 Claim. (Cl. 56—303)

This invention relates to mowing or cutting machines, and has for its object a motion transmitting mechanism between the rotating actuator and the reciprocating knife of the machine by which the knife or knives can be reciprocated or actuated in acute angular positions above and below the horizontal position.

The actuating mechanism is intended primarily for mowers used to cut grass, weeds, etc. along highways, where at some places the strips along the side of the road are level, and at other places are flanked by downwardly or upwardly inclined banks, or the roads are flanked by the roadside drainage ditches, but said mechanism is equally useful in cutting grass and crops in hilly fields.

The cutting mechanism, that is, the finger bar and knife, is carried by a vehicle which may be horse drawn, but is usually drawn by a tractor or motor vehicle, and projects laterally therefrom, and the finger bar may be folded up in the usual manner into vertical position when not being used.

The invention consists in the novel features and in the combinations and constructions hereinafter set forth and claimed.

In describing this invention, reference is had to the accompanying drawings in which like characters designate corresponding parts in all the views.

Figure 1 is a fragmentary plan view of a mowing machine cutter mechanism embodying this invention.

Figure 2 is a sectional view taken approximately on the plane of line 2—2, Figure 1.

Figures 3 and 4 are fragmentary views illustrating the position of the parts of the knife actuating mechanism, when the finger bar is adjusted to its maximum angle below the horizontal and to its maximum cutting angle above the horizontal.

1 designates the finger bar which is hinged at its inner end at 2 to a support or frame 3, generally called the shoe hinge. 4 is the usual inner mower shoe which slides over the ground, this being secured to the inner end of the finger bar adjacent the frame 3. There is also the usual outer shoe, not shown, at the outer end of the finger bar which rides or floats over the ground in the usual manner and causes the outer end of the bar to follow the contour of the ground.

5 is the reciprocating knife of any well known construction. The finger bar and knife thereon are angularly raised about the axis 2 into an inoperative or vertical position and lowered into horizontal or operative position in the usual manner, the finger bar swinging about the axis 2. The finger bar and knife are caused to follow the contour of the ground by being spring suspended and to automatically raise and lower toward and into extreme angular position above the horizontal and into extreme position below the horizontal, by the shoe at the outer end of the finger bar following the contour of the ground.

The knife is reciprocated or actuated on the finger bar in any suitable manner, as by the usual rotating actuator or crank shaft 7, which is suitably supported in the frame 8 of the mowing machine and is provided with a crank 9, on a counter weighted disk 10, which is mounted on the shaft 7. Heretofore, this actuator has been directly connected by a single connecting rod to the reciprocating knife.

The motion transmitting means consists of a connecting rod 11 mounted at one end on the crank 9 pivotally connected at its other end to an oscillating motion transmitting member carried by the frame 3, and means for transmitting the motion of the oscillating member to the knife.

12 designates the oscillating motion transmitting member pivoted at 13 to the frame 3 above the axis 2 of the finger bar and depending from its pivotal point. The connecting rod 11 is also pivotally connected to the lower end of the member 12, as by a universal joint 14.

The means for transmitting the motion of the oscillating member 12 to the knife consists of a link 15 pivotally connected at its opposite ends, as by ball and socket joints 16 and 17, to the oscillating member 12 and to the reciprocating knife 5. This link 15 is preferably of slightly greater length between the axes of its pivotal points 16 and 17 than the throw or stroke of the knife or the diameter of the orbit of the crank 9. Its length is then slightly greater than the radius of the crank 9 or the distance between the points P of the knife blades or between the points P' of the finger bar. The pivotal axis 17 is in line with the axis 2 when the knife 5 is in starting position (Figure 2) that is, at the end of its throw inward or to the right. The oscillating member 12 is then in the radial angular position shown in Figure 2, and the pivotal point 16 of the link 15 is below the horizontal plane of the axes 2, 17. The pivotal axis 16 thus moves in an arc having its chord inclined slightly upward toward the axis 2. This arrangement of the oscillating member 12, the link 15 and its pivotal points 16, 17 relative to the axis 2 results in easy working of the knife 5 or the transmitting of the reciprocating movement of the connecting rod 11 to the knife in all of the cutting angles the knife 5 assumes, that is, all angles between 55° above horizontal to 30° below horizontal.

The oscillating member 12 and the link 15 results in the knife working as easily in its maximum angular positions above and below the horizontal, as in horizontal position, or, in other words, results in uniform working of the knife in any acute angular position above or below horizontal, as well as in a straight or horizontal cutting position. The maximum cutting angle above horizontal is approximately 55° and below horizontal is approximately 30°.

Owing to the oscillating member 12 and the location of its hinge 13, the link 15 and its arrangement relative to the oscillating member 12 and the knife 5 and the length thereof relative to the throw of the knife, the thrust and pull of the connecting rod 11 is transferred to the reciprocating knife 5 without undue binding or loss of power in any angular position of the knife between its maximum angles above and below horizontal, so that the knife is operable to cut weeds and grass on a level and on steep inclined banks.

What I claim is:

In a mowing machine, a frame, a cutter assembly including a movable cutter pivoted to the frame for sliding movement over the ground and operable through a vertical arc of substantially 90° above and below the horizontal, a motion transmitting member pivoted at one end to the frame for swinging movement thereon and depending therefrom, a link connecting the cutter and lower end of the motion transmitting member and pivoted to each, said motion transmitting member being movable from a retracted position wherein its pivotal connection with the cutter substantially coincides axially with the axis on which the cutter is pivoted to the frame to an advanced position wherein said pivotal connection is out of alignment with said pivotal point, and means for reciprocating the motion transmitting member.

THOMAS A. DELANEY.